June 4, 1935.　　　　H. ALFARO　　　　2,003,331
AIRCRAFT HAVING SUSTAINING ROTORS
Filed Dec. 9, 1931　　　7 Sheets-Sheet 3
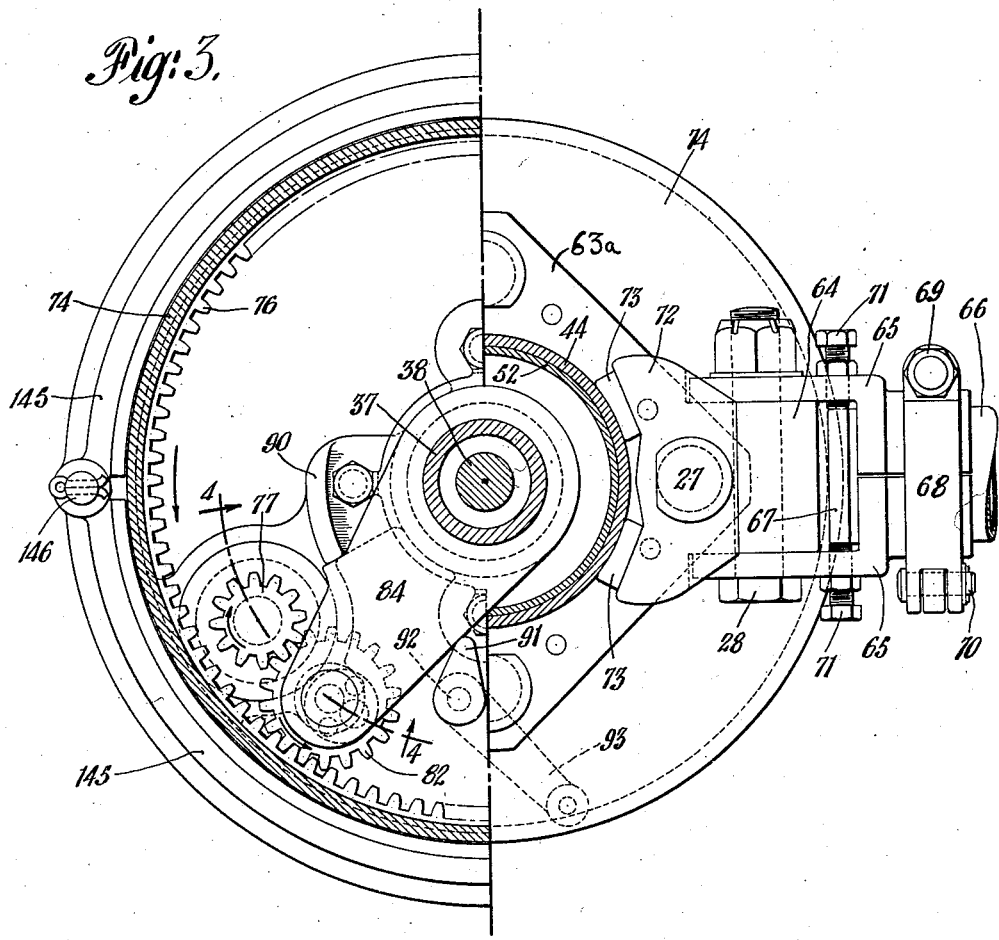
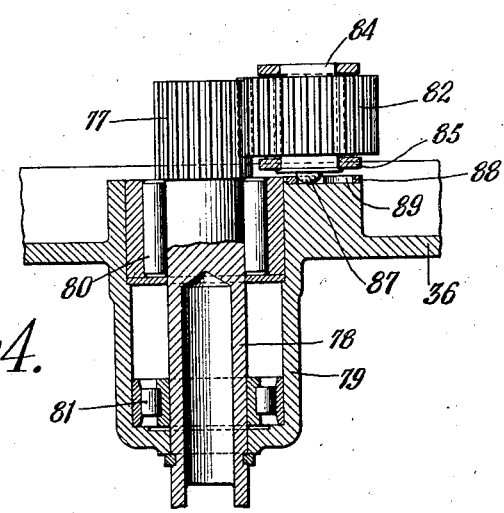

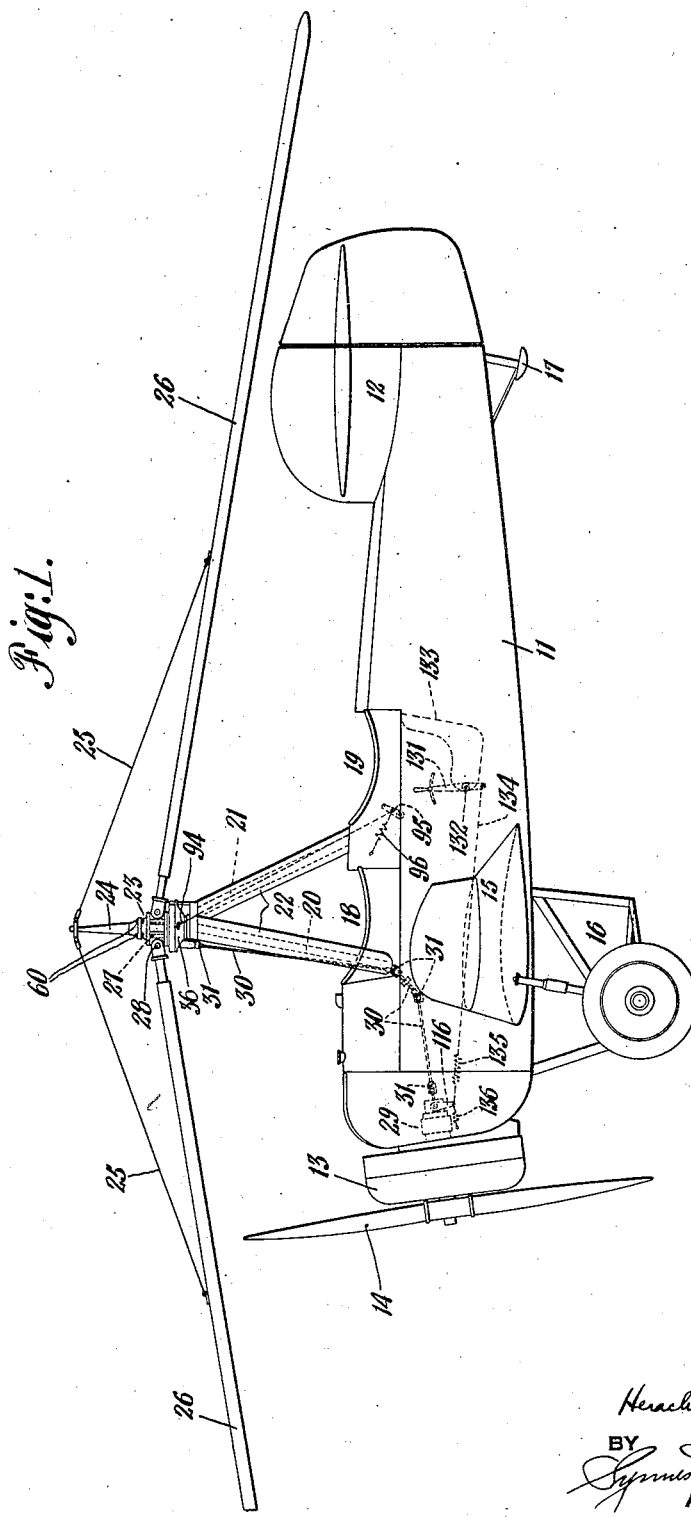

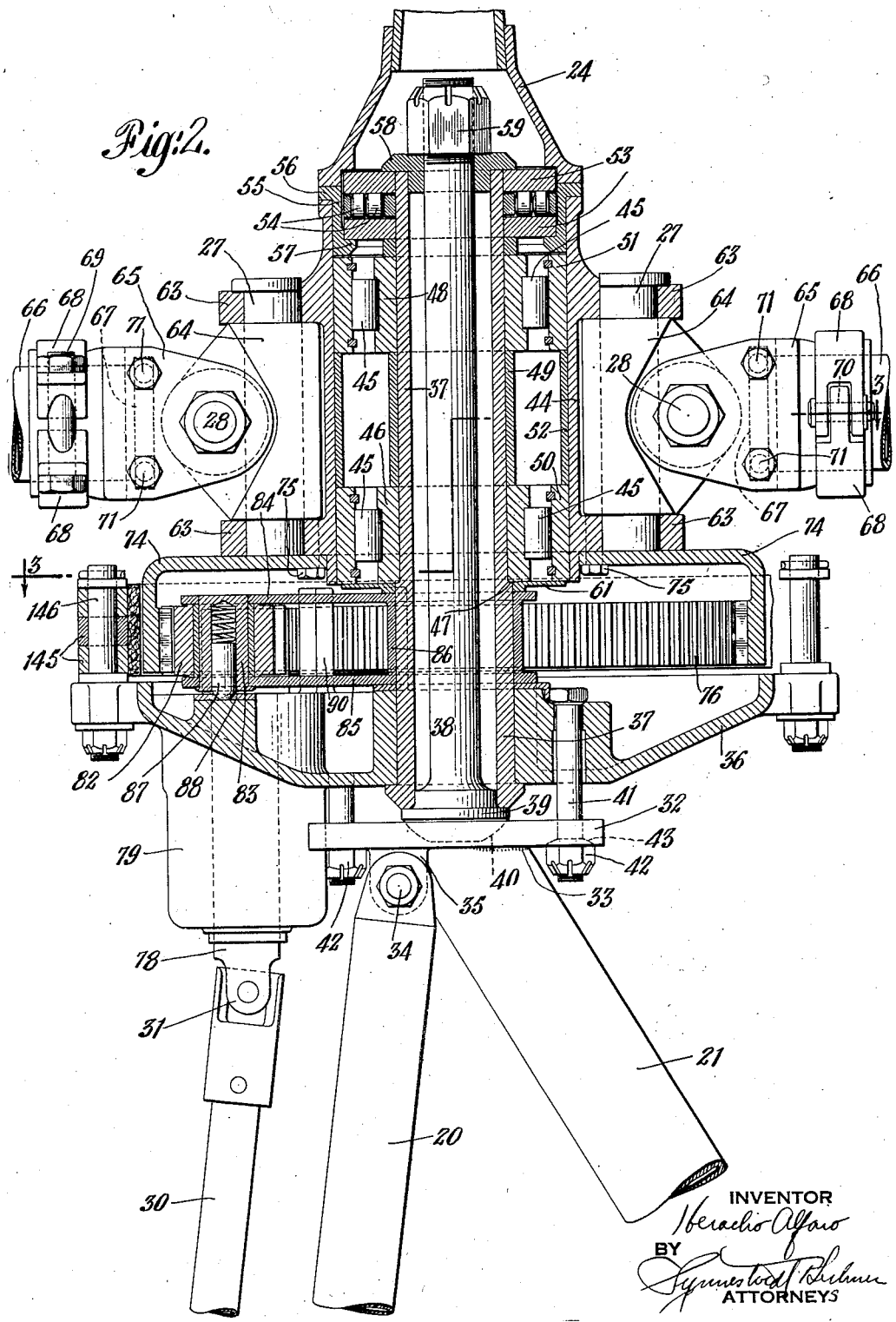

June 4, 1935.   H. ALFARO   2,003,331
AIRCRAFT HAVING SUSTAINING ROTORS
Filed Dec. 9, 1931   7 Sheets-Sheet 4

INVENTOR
Heraclio Alfaro
BY
ATTORNEYS

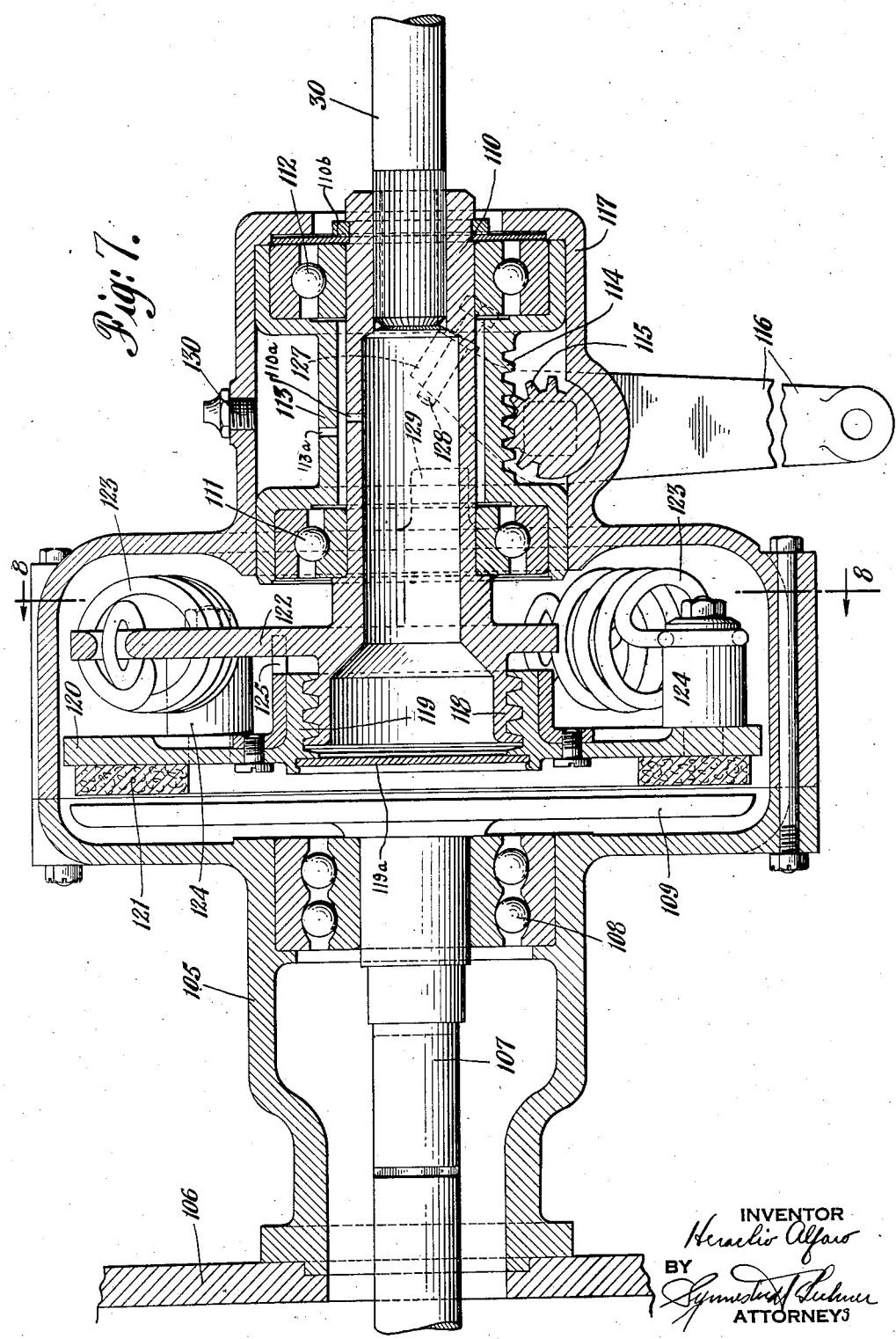

June 4, 1935.  H. ALFARO  2,003,331
AIRCRAFT HAVING SUSTAINING ROTORS
Filed Dec. 9, 1931   7 Sheets-Sheet 6

INVENTOR
Heraclio Alfaro
BY
ATTORNEYS

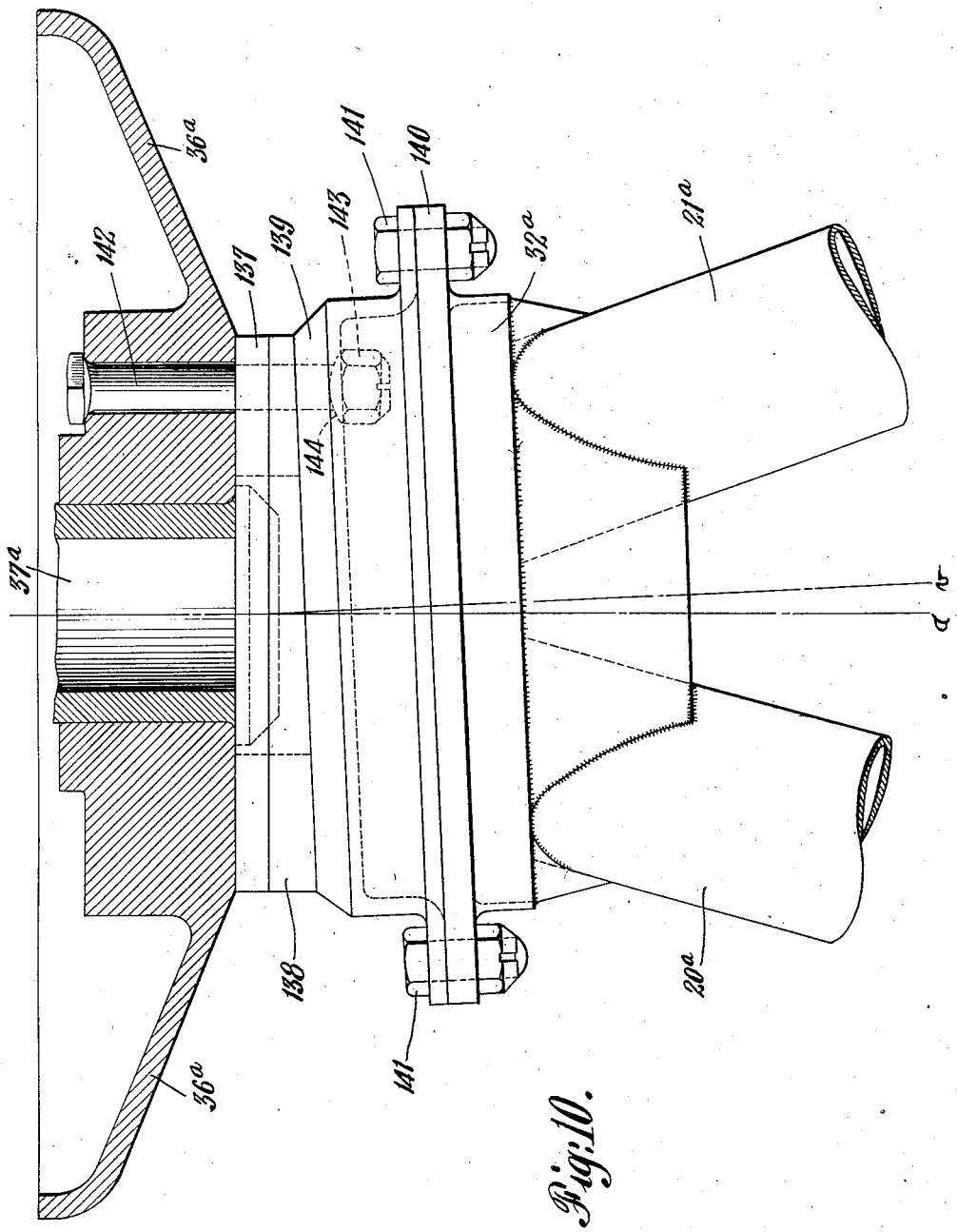

Patented June 4, 1935

2,003,331

UNITED STATES PATENT OFFICE 2,003,331

AIRCRAFT HAVING SUSTAINING ROTORS

Heraclio Alfaro, Abington, Pa., assignor to Autogiro Company of America, Philadelphia, Pa., a corporation of Delaware Application December 9, 1931, Serial No. 579,853

13 Claims. (Cl. 244—19)

This invention relates to aircraft having sustaining rotors and is more particularly concerned with the type of craft in which the sustaining rotor is composed of a plurality of sustaining blades or wings mounted for rotation about a common substantially vertically extended axis and also for individual movements with respect to the rotor axis structure in order to compensate for variations in flight forces.

Generally considered, the present invention has reference to a novel type of mounting structure for the rotor system and novel means for imparting a torque to the rotor, especially adapted for starting purposes, and also an efficient correlation of the mounting and rotor driving parts.

Other more or less general objects and advantages contemplated by this invention include simplification of the mounting and rotor driving mechanisms, reduction in the size and weight of such mechanisms so that parasite drag, head resistance and the like are reduced to a minimum, and the general efficiency of the craft as a whole is improved.

More specifically, it is an object of the present invention to provide a novel type of rotor mounting structure including a plurality of leg elements extended upwardly from the body of the craft which are associated with an apex device of the simplest possible form. The mounting structure further provides for convenient detachment of the rotor hub or axis structure, from the apex device, as a unit, provision also being made for adjusting the extension of the rotor axis with respect to the fixed mounting parts by means of a novel and very simple adjusting structure.

A further object of the invention is involved in the arrangement of the rotor hub in such manner as to provide for the utilization of hub parts of the simplest possible form so that machining and production costs are materially reduced. As a further object, in this connection, the invention has in view utilizing highly efficient types of radial and thrust bearings between the fixed and rotatable parts of the hub.

In connection with the rotor driving mechanism herein disclosed, it is noted that various parts thereof are arranged for neat and compact cooperation with the mounting and hub structure, it being an object, in this connection, to provide for ample protection, particularly for the movable parts, of the rotor driving or starting mechanism, and also to provide ample clearances for blade swinging movements even though the blade mounting parts and the starter mechanism be disposed relatively closely adjacent to each other. In accordance with the present invention, this portion of the structure is further arranged for efficient cooperation with a rotor brake, all of such parts being constructed to occupy a minimum of space so that they cooperate with each other in reducing the overall diameter of the rotor head.

As a further object, the invention contemplates the use of a novel power transmitting mechanism for utilizing the power of a prime mover of the craft to actuate the rotor system, particularly prior to take off. This mechanism is associated with the hub or head of the rotor system in such manner as to permit adjustments to be made in the angular extension of the rotor axis without disturbing the driving connection. In accomplishing the foregoing, the present invention makes use of a gear carried by and movable with the rotor hub, the said gear being operatively associated with an additional gear or pinion which is mounted on a shaft arranged for movement with the rotor head during angular adjustments thereof with respect to the supporting structure. A flexible driving connection is extended between the gear or pinion last mentioned above and the prime mover of the craft so that angular adjustments of the rotor axis do not disturb the driving connection.

Additionally, the present invention provides for the use of a gear of the internal type as the driven element carried by the hub and, in the preferred embodiment, this internal gear is formed at the inner side of a downwardly open drum structure. The driving elements which cooperate with the internal gear, therefore, are housed within such drum structure and are thus well protected from dust, dirt, moisture and the like.

According to this invention, the gear or gearing which is associated with the gear carried by the hub is arranged for disentrainment or disengagement from the hub gear during normal flight operation. This is of importance since it reduces the number of parts rotating with the hub, during normal flight, to a minimum.

The gearing above referred to, furthermore, is also constructed to provide for disentrainment thereof under the influence of overrunning of the rotor with respect to the source of power, this being a safety factor of considerable importance. The present invention also has as an object constructing the gearing referred to in such manner that, upon entrainment thereof, the transmission of power from the power source to the rotor tends to maintain the interengagement or entrainment of the gears.

A novel type of manual control is also associated with the gearing considered above, this control being arranged for automatic release and cooperating with the gearing in such manner as to prevent entrainment thereof during normal flight operation. In this way, a fool-proof means is provided for ensuring that the rotor will always run as freely as possible.

Still further, and with a view to additionally reducing the total diameter of the rotor hub or head, this invention makes provision for the disposition of the individual blade articulations in a novel manner so as to bring them all closely adjacent to the center of rotation or axis of the rotor system. Further, with this object in view, the invention provides a novel type of means for the attachment of the blades to the blade articulations and therethrough to the hub, such means being constructed to incorporate a mechanism for adjusting the incidence of the individual blades or wings, and this mechanism being arranged to occupy a minimum of space and neatly cooperate with the blade mounting structure both to simplify and to reduce the weight thereof.

The invention further provides a simple and novel type of power takeoff means which may conveniently be associated with a prime mover and, in the structure of this power takeoff means, I preferably incorporate a manually operable clutch of a novel type in order to control the transmission of power from the prime mover to the rotor. The clutch device or mechanism of this invention is constructed in such manner as to automatically limit the torque which may be transmitted from the prime mover to the rotor. According to this invention, furthermore, the torque limiting mechanism is so arranged that, upon operation thereof, the normal torque which may be transmitted is not decreased but maintained substantially at a constant value. In this way the danger of damage to or breakage of rotor or rotor driving parts is reduced to a minimum, while at the same time proper driving torque is maintained during starting.

In addition to the foregoing, the invention makes provision for a novel type of control or actuating mechanism for the clutch, the said mechanism including spring means interposed therein in such a manner as to avoid damage to the clutch actuating and adjusting means.

How the foregoing, together with other objects and advantages, are obtained will be apparent from the following description making reference to the accompanying drawings, in which Figure 1 is a side elevational view of a craft constructed to embody various novel features of this invention including the novel arrangement of rotor head or hub and rotor driving parts;

Figure 2 is a vertical sectional view through the rotor hub or head structure, this view also including portions of the mounting structure for the rotor system;

Figure 3 is a view partly in top plan and partly in horizontal section, taken approximately on the line 3—3 of Figure 2, particularly illustrating portions of the rotor driving mechanism and portions of the means employed for the attachment of a blade to the hub;

Figure 4 is a vertical sectional view, on the line 4—4 of Figure 3, of certain details of the rotor driving mechanism illustrated in Figures 1, 2 and 3;

Figure 7 is a vertical sectional view through the clutch mechanism of this invention;

Figure 10 illustrates a modification of the rotor hub mounting structure, the view being taken similarly to Figure 2 but illustrating only a portion of the structure.

Figure 5:
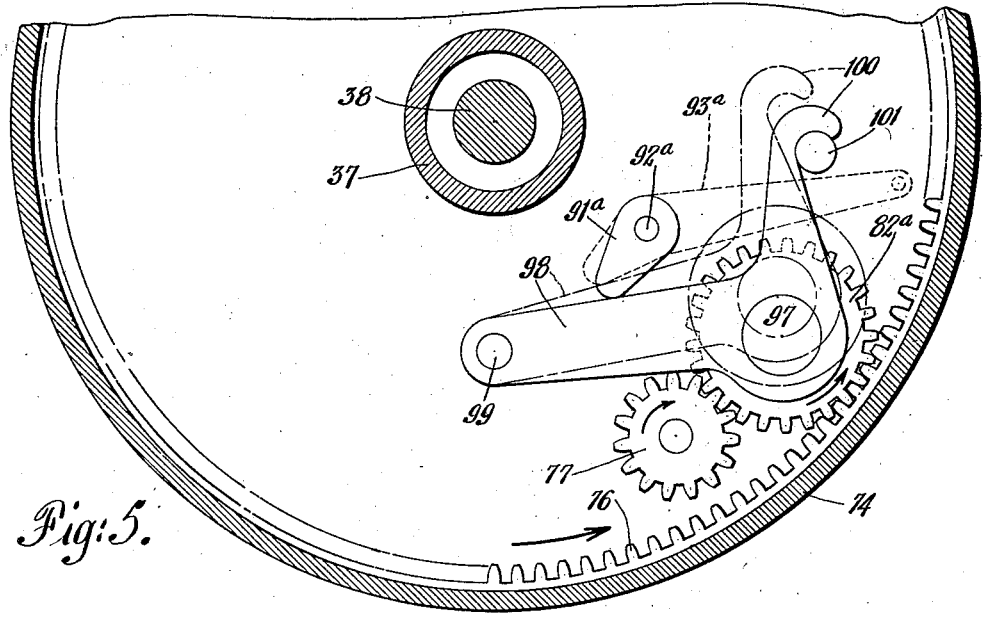
Figures 5 and 6 are views, in horizontal section, of modified forms of driving mechanism which might be employed in place of the structure of Figure 3.

It should first be noted that in Figure 1 the craft illustrated includes a fuselage 11 having an empennage 12 and an engine and propeller 13—14. Supplemental fixed lifting surfaces 15 may be extended laterally at the sides of the craft and suitable landing gear 16 as well as a tail skid 17 serve to support the craft on the ground.

The fuselage 11 is provided with a pair of cockpits 18—19 over the forward one of which (18) the rotor system is mounted. For the purpose of mounting the rotor I prefer to employ a plurality of leg elements 20—21 which, as indicated in Figure 1, may be enclosed within streamline sheaths 22. The legs or posts 20 and 21 serve to support the rotor hub, generally indicated by the reference numeral 23 in Figure 1. An upward extension 24 of the hub 23 serves as a point of attachment of the blade supporting cables 25, these cables being provided in order to prevent the blades from drooping unduly when the rotor is not operating at flight speeds or when the rotor is at rest.

As shown in Figure 1, the rotor system itself is composed of a plurality of wings or blades 26 which are mounted for rotation, under the action of relative air flow, about the axis of the mechanism 23 and which are also pivotally attached to such mechanism as by means of vertically and horizontally extended pivot pins 27 and 28.

The rotor driving mechanism of this invention includes a power takeoff and clutch unit indicated generally at 29 in Figure 1 as being associated with the forward propulsion engine or prime mover 13. A flexible power transmitting shafting 30 is extended rearwardly and then upwardly from the power takeoff 29 at a point just below the rotor hub 23. This shafting, as seen in Figure 1, includes a plurality of flexible or universal joints 31.

Before considering the details of the rotor driving mechanism itself, various features of the rotor hub and its supporting structure should be noted. As seen in Figures 1 and 2, the leg elements 20 and 21 converge upwardly and substantially meet at a point disposed generally above the forward cockpit 18 of the craft. At their upper ends, these leg elements are attached to a table or plate-like apex member 32. The attachment may be effected in any suitable manner and, as shown in Figure 2, the leg 21 is welded as indicated, for example, at 33, while the element indicated at 20 (two of these preferably being employed) is bolted as at 34 to a lug 35.

In supporting the rotor head on the structure 32, I prefer to employ a normally fixed hub base 36, this base being centrally apertured to receive the hollow spindle 37. Extending vertically through the spindle 37, I provide a tie member 38 having a boss 39 at its lower end formed with a semi-spherical surface 40. The surface 40 is complementary to a similarly formed concave surface at the upper side of the plate-like apex member 32 and, in this way, a firm point of support is provided for the entire rotor system and, at the same time, freedom for angular adjustments of the spindle 37 and the tie member 38 is afforded. In order to fix the rotor head base 36 as well as the central spindle parts 37 and 38 in any adjusted position, I prefer to employ a plurality of bolts 41 which serve to tie the members 36 and 32 to each other. The nuts 42 of bolts 41 preferably have rounded or ball surfaces 43 seated in similarly shaped recesses or cavities in the plate 32. These various parts with their ball and socket interengagement, therefore, provide a firm attachment for the rotor hub and yet permit of angular adjustments of the axis of the rotor with respect to the fixed mounting structure.

The rotor hub member proper is indicated at 44 as being of the simplest possible form, it being noted particularly that only a single and entirely regular cylindrical bore is provided therein. The hub part 44, of course, is fitted over the central and fixed spindle parts 37 and 38 and interposed between these two relatively movable hub parts I have provided roller bearings 45 to take the radial loads. The inner race 46 of the lower bearing 45 abuts, at its lower edge, against a shoulder 47 provided externally of the spindle part 37. The inner race 48 of the upper bearing 45 may conveniently be spaced from the race 46 as by the collar or sleeve 49. The outer races 50 and 51, respectively of the lower and upper bearings 45, are similarly spaced as by means of the collar 52.

The bearing employed to take the thrusts of sustention of the craft, as well as of the weight of the rotor when the craft is at rest on the ground, also takes the form of a roller bearing. In the construction shown, a pair of spaced annular discs 53 constitute the races for the rollers 54, the discs 53 being interposed, of course, between the central spindle 37 and the hub member 44. A collar 55, having an external flange 56 extended above the upper edge of the hub member 44 and an internal flange 57 extended below the lower bearing race 53, serves to transmit the thrust of sustention from the hub member 44 to the lower bearing race. The upper bearing race 53 abuts against the externally flanged fitting 58, this fitting being rigidly secured in the upper end of the spindle 37 as by means of nut 59 threaded on to the upper end of the tie member 38. The fitting 58, therefore, serves to transmit the thrust of sustention from the thrust bearing itself to the fixed parts of the rotor mounting structure. The upper portion of the hub structure is completed by the application of the tip or cone 24, this being securely fastened to the hub member proper as by means of bolts 60 (see Figure 1).

The hub structure considered above is formed in such manner as to constitute a reservoir for lubricant, preferably a soft grease. Lubricant, of course, may be packed in the spaces between the spindle 37 and the hub part 44 and, below the races of the lower bearing 45, an annular disc 61 is positioned in order to prevent loss of the lubricant.

For the purpose of attaching the individual blades to the rotor hub 44, this hub member is provided with pairs of vertically spaced and vertically apertured lugs 63 into which the vertically extended individual blade pivot pins 27 are inserted, said lugs being easily and conveniently formed by squaring off the flange members one of which is shown at 63a in Figure 3.

Each of the blades is secured to its vertical pivot pin 27 in substantially the following manner:

An extension block or joint member 64 (see Figs. 2 and 3) is apertured to receive the pin 27 and is further provided with an additional aperture extended substantially horizontally to receive the pin 28. The horizontally apertured portion of the block 64 is further embraced by bracket members 65—65 which constitute a forked blade root fitting. In Figures 2 and 3 the root end of the blade spar is indicated at 66 as being extended into or between the complementary bracket members 65—65 to be embraced thereby. At its inner end, the blade spar is further provided with a squared block 67 which may conveniently abut against the base of the root fitting 65—65 in the manner clearly illustrated in Figure 2. After assembly of these parts a split securing or fastening ring 68—68 is applied to the two parts of the fitting 65—65 and rigidly tightened thereon as by means of the bolt 69. The two halves of the ring 68—68 are, of course, pivoted to each other at a point diametrically opposite to the bolt 69 as by means of a pivot pin 70.

In order to provide for adjustment of the incidence of the individual blades, I prefer to employ adjusting bolts 71 arranged at four corners of the squared block 67 and taking into the fork parts of the brackets 65—65. The disposition of these adjusting parts in the manner just described provides for an extremely simple blade incidence adjustment, all the parts of which are compactly arranged as well as disposed in such manner as to utilize space between the bracket members 65—65. The frontal area and weight of these various parts is thus kept very small.

The blade attachment structure, furthermore, also provides a novel and highly efficient type of mechanism for controlling the individual blade movements about their substantially vertically extended pivots. For this purpose, I utilize bracket devices 72 (see Fig. 3) which are rigidly mounted on the extension blocks 64. Rubber bumpers 73—73 are interposed, under compression, between each bracket 72 and the central hub 44, there being a pair of bumpers associated with each bracket, one arranged at either side of the axis of the pin 27. It is to be observed that this blade movement control mechanism is also very compactly arranged and further requires a minimum number of parts so that the total weight and parasite drag incident thereto is kept at a low value.

Just below the lower blade attaching lugs 63 of the hub member 44, I provide a downwardly open drum structure 74, this structure being fastened to the member 44 as by bolts 75. The inner surface of the cylindrical portion of the drum is provided with teeth 76 to constitute an internal gear through which torque may be imparted to the rotor system.

In addition to serving as a driving element for the rotor, the drum 74 also serves to cooperate with a rotor brake. In accordance with the showing of Figures 2 and 3, this brake includes a pair of semi-circular band members 145, two adjacent ends of which are pivoted by means of a pin 146 mounted at the periphery of the rotor head base 36. The opposite adjacent ends of the elements 145 may be associated with any suitable mechanism adapted to contract the brake, i. e., bring the two parts thereof toward each other to bear against the outer surface of the cylindrical portion of the drum 74. As will be readily understood, a suitable control for the brake may be extended from the rotor head downwardly to a cockpit of the craft, and it will be noted that this arrangement is highly efficient since the drum 74 serves not only for the transmission of power to the rotor but also as an element through which a braking reaction is obtained.

In accordance with the arrangement of Figures 2, 3 and 4, a spur gear 77 is mounted at the upper end of a shaft 78 which is journalled in a housing 79 as by means of roller bearings 80 and 81. This housing 79 may conveniently form a part of the base structure 36 of the rotor head and thus always maintains the shaft 78 in a given angular relation with respect to the internal gear 76, it being noted that the base 36 as well as the various movable parts of the rotor head are all mounted as a unit at the top of the fixed pylon structure including the legs 20, 21 and the apex member 32. The shaft 78, of course, is connected as by means of a universal joint 31 to the shafting 30 which is extended downwardly to the prime mover of the craft.

For the purpose of completing the driving connection between the spur gear 77 and the internal gear 76, I prefer to employ an idler 82. This idler is provided with a bearing around the shaft or pin 83, the said shaft being supported in upper and lower lateral extensions 84 and 85 which project from a collar or sleeve 86, the latter being mounted for rotation around the central and fixed rotor spindle 37. Thus, upon movement of the extensions or supporting arms 84 and 85 about the axis of the rotor as a center, the idler 82 may be brought into and out of mesh with the spur gear 77. In order to retain the idler in either one of its two positions, i. e., in entrained or disentrained position, a spring pressed plunger 87 is arranged, preferably internally of the shaft 83 for the idler 82, in such manner as to cooperate with an abutment 88 which is recessed as, for example, at 89 to receive and retain the plunger 87 in two different positions. In moving from one position to another, of course, the plunger 87 rides up over the abutment from one recess to another.

Before considering the actuating mechanism for this idler gear, it should be noted that the arrangement of the three gears 76, 77 and 82 is such that upon engagement, the transmission of power tends to maintain the interengagement. In order to prevent the gears from meshing beyond their normal pitch lines, therefore, I employ an abutment 90 which cooperates with the arms 84 and 85 to limit the movement thereof. It is further to be observed that the arrangement of gears is such that upon overrunning of the rotor with respect to the power, the idler will automatically be drawn out of engagement with the spur 77 by the internal gear 76, and it is noted in this connection that, upon disengagement of the driving connection, the internal gear 77 and only a single spur gear (idler 82) rotate with the rotor itself.

The actuating mechanism for the idler gear (see Fig. 3) includes a cam element 91 arranged to bear against the idler support 84. The cam, furthermore, is mounted for rotation with the shaft 92, the latter being actuable by means of a lever 93 which, in turn, is connected by means of a flexible cable 94 (see Fig. 1) extended downwardly into the cockpit 19 of the craft for connection with an additional and manually operable control 95. A return spring 96 may be employed to ensure release of the lever 95 and thus maintain the released position at all times except when it is positively actuated for the purpose of engaging the gears.

Figure 6:
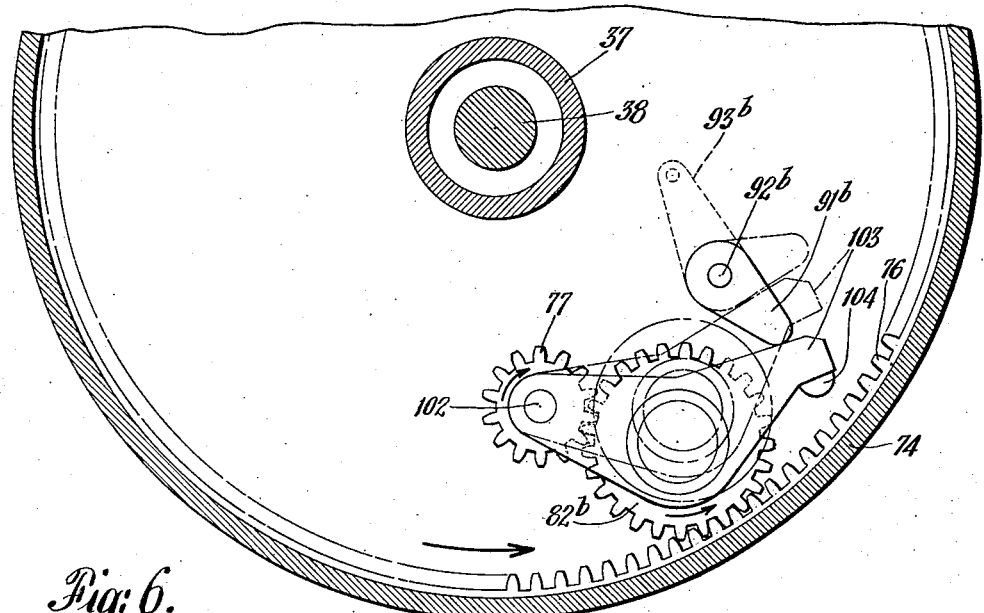

In Figures 5 and 6, I have illustrated two modifications of the gearing arrangement associated with the internal gear 76. In Figure 5 the spur gear 77 is arranged for engagement with an idler 82a, the shaft 97 of which is carried by a lever 98. Lever 98 is pivoted as at 99 to provide for movement of the idler into and out of engagement with the internal gear 76 and the spur 77 and the lever is further provided with an extension having a hooked end 100 adapted to engage a stop 101 for the purpose of limiting the degree of meshing between the gears. The actuating mechanism is here modified to include a cam 91a mounted for rotation with the shaft 92a and for cooperation with one side of the lever 98. The shaft 92a, and thus the cam, may be actuated in a manner similar to that described above in connection with Figure 3, by means of a lever 93a which may be suitably coupled by means of a flexible cable to a control in a cockpit of the craft.

This arrangement, as well as the arrangement of Figure 6, is advantageous in somewhat simplifying and reducing the weight and number of parts employed, it being noted particularly that the support for the idler gear provides for disengagement thereof, under the influence of overrunning of the rotor, from the internal gear 76, so that no intermeshing gears rotate with the rotor in normal flight operation.

In Figure 6, I have utilized the shaft 102 of the spur 77 as a pivot for the idler support 103. According to this form, the idler 82b always remains in mesh with the spur 77 and the pivotal movement of the support 103 provides only for disengagement of the idler from the internal gear 76. A stop 104 is also employed in accordance with this form to limit meshing of the gears. Actuation of the support 103 to provide for engagement may be effected by means of cam 91b, shaft 92b and lever 93b in a manner similar to that described above, although it is to be observed that if desired the manual control may be eliminated when the gearing is arranged as shown in Figure 6. Since the idler 82b always remains in mesh with the spur 77, the application of a driving torque to the spur, as by engaging the starter clutch to be described more fully hereinafter, will have a tendency to move the idler and its support 103 into mesh with the gear 76. This action, as well as the action of disentrainment under the influence or overrunning of the rotor, will be apparent from inspection of the drawing in which the direction of rotation of the several gears is indicated by suitable arrows applied thereto. When this arrangement of gearing is employed, therefore, the operations or manipulations necessary to initiate rotation of the rotor are reduced to a minimum and, at the same time, the desirable safety feature of free overrunning with no gears intermeshing during normal flight operation is also assured.

Figure 9:
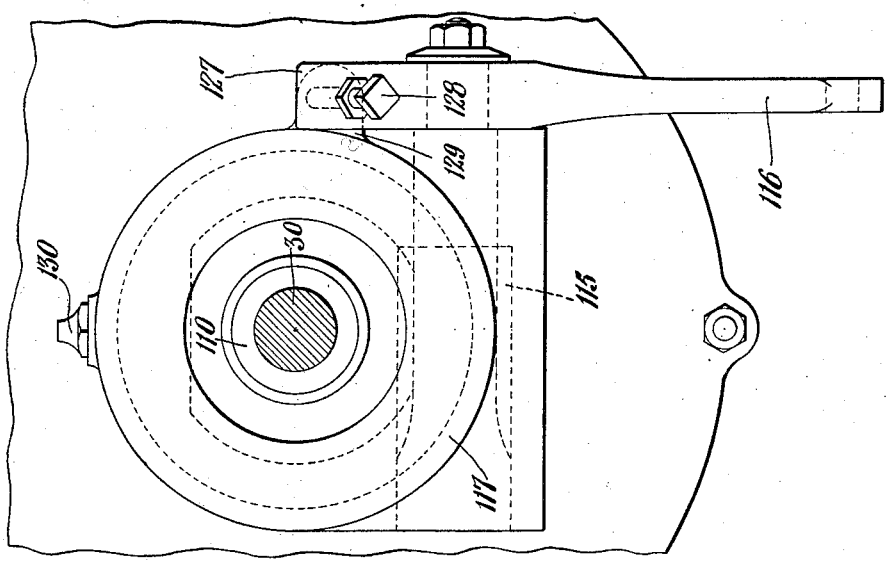
Figure 9 is a fragmentary view of portions of the clutch mechanism, the view being taken from the right of Figure 7.
Figure 8:
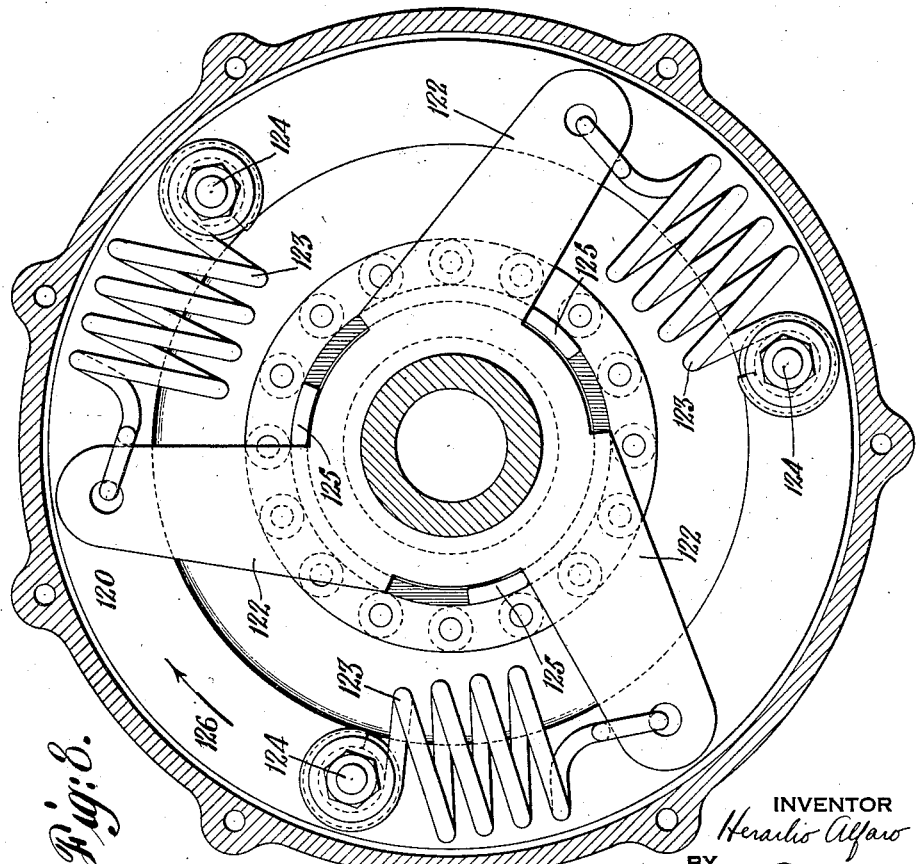
Figure 8 is a sectional view taken substantially as indicated by the section line 8—8 on Figure 7.

Turning now to the disclosure in Figures 7, 8 and 9 in which the power takeoff and clutch mechanism is illustrated in detail, it is first to be observed that the casing 105 for this mechanism is illustrated (see Fig. 7) as being attached to a portion 106 of the engine structure. A shaft 107 connected with any suitable rotating portion of the engine is extended rearwardly and provided with a bearing 108 in the casing 105. At its rearward end, a disc 109 is mounted on this shaft for rotation therewith. The shaft 107 and the disc 109, of course, rotate with the engine at all times and the disc 109 serves as one element of a clutch mechanism now to be described.

The shafting 30 which is extended downwardly from the rotor system to be coupled with the engine is splined with a hollow shaft 110, the latter being journalled as by bearings 111—112 in a sleeve 113. Shaft 110 together with its bearings and the sleeve or supporting structure 113 is movable axially of the shafts 107 and 30 by means of a rack 114 and a cooperating segmental gear 115, the latter of which may be rotated by means of a lever 116 arranged exteriorly of the housing portion 117. At its forward end the shaft 110 is provided with an externally threaded boss 118 to cooperate with a complementarily threaded collar 119 which carries a disc 120. The disc 120 is arranged in juxtaposition to the disc 109 and one of them preferably the former, carries suitable clutching material, such as asbestos, 121. The foregoing construction provides for axial movement of the shaft 110 (by means of lever 116) and such movement similarly causes the disc 120 to advance toward the disc 109 and thus clutch the two discs to each other through the material 121.

Torque is transmitted from the disc 120 to the shaft 110 by means of arms 122 projecting from the latter, these arms being connected by means of springs 123 with posts 124 carried at the rear face of the disc 120. Stop members 125 are also carried by the disc 120 and project therefrom between adjacent levers 122 and thus limit relative rotation of the arms 122 and the disc 120.

The construction of various of the foregoing parts is such that the stops 125 serve to maintain the levers 122 and the disc 120 in such relative position that the spring tension therebetween approximates that incident to the transmission of a normal driving torque and, as will be seen from inspection of Figure 8 in which the direction of rotation of the disc 120 is indicated by the arrow 126, the transmission of power from the disc 120 to the shaft 110 (through levers 122) is effected only through the springs 123.

Bearing the foregoing in mind it should now be noted that the threaded engagement between the parts 118 and 119 is such that if an excessive load be imposed upon the shafting 30 the springs 123 will become elongated beyond the normal point and thus cause relative rotation of the parts 118 and 119 in a direction tending to relieve the pressure between the disc 120 and the cooperating clutch element 109.

Thus the foregoing provides a torque limiting mechanism incorporated in the clutch itself. The character of the limiting mechanism, furthermore, is such that the parts tend normally to continue the transmission of a predetermined torque but to prevent the transmission of torque in excess of that predetermined. In other words, if, in relieving a sudden torque surge, the device reduces the clutch plate pressure to a point where slippage occurs, under which conditions the delivered torque might rapidly fall below the desired value, this reduction in value of delivered torque automatically increases the pressure sufficiently to overcome the reduction in the coefficient of friction resulting from slippage.

This mechanism operates to eliminate undue stresses and possible damage to the rotor and rotor driving mechanism under various circumstances, for example, when the engine throttle is opened too rapidly during starting of the rotor. The resilient or yielding clutch connection, of course, also reduces the danger of damage which might otherwise result from more or less violent shocks of various kinds. With a view to preventing engagement of the clutch beyond the point at which the desired torque limiting operation will be produced, the control lever 116 is provided with an extension 127 having an adjusting bolt 128 mounted therein for cooperation with a fixed stop or abutment 129. This adjusting mechanism may also be employed to compensate for wear in the clutch facing and thus ensure proper clutch operation at all times.

To facilitate free and smooth sliding of the shaft 110 and its bearings and supporting housing within the casing portion 117, a lubricant fitting 130 may be arranged to discharge lubricant into a cavity formed between the bearings 111 and 112. This also serves to lubricate the rack and gear device 114—115, as well as the bearings 111—112, the spline between parts 30 and 110 and the intermeshing threads on the elements 118 and 119, the latter three points being reached by the grease or other lubricant through the apertures or ports 113a and 110a. A disc 119a is arranged to close the left end of the hollow shaft 110 through which the lubricant is fed to the parts 118 and 119 and serves to prevent loss of the lubricant at this point. Additional grease or lubricant sealing means 110b is applied at the outer edge of the bearing 112 to prevent lubricant loss at this point.

In Figure 1, the extension of the manually operable control for the clutch rearwardly to the cockpit 19 is clearly illustrated as including a control lever 131 mounted in the said cockpit on a pivot 132 adjacent to the pilot's seat 133. The lever is connected by means of a cable or link 134 to the lever 116 of the clutch mechanism. A spring 135 is preferably interposed in the connection 134 and is of such strength as to transmit to the lever 116 the force needed to completely engage the clutch but to prevent the transmission thereto of any excessive pull on the control in the cockpit. An excessive pull on the cockpit lever 131 will simply result in elongation of spring 135 after the adjusting screw 128 comes against fixed stop 129. A release or return spring 136 may also be associated with the lever 116 to maintain the clutch in disengaged position when it is not in use. Spring 136 must be of less tension than spring 135, since the latter must be strong enough to engage the clutch as well as to overcome the tension of spring 136.

Turning now to Figure 10 in which a modification of the rotor head supporting structure is illustrated, it will be seen that the pylon legs 20a and 21a are extended upwardly at converging angles to the apex device 32a. In this instance, all of the pylon legs are shown as being welded to the device 32a although it will be understood that a bolt and lug arrangement similar to that illustrated in Figure 2 may also be employed for the purpose of attaching the pylon legs.

According to this modification the base portion 36a of the rotor head proper is provided with a central aperture to receive the rotor spindle member 37a for the transmission of thrust from the latter to the former and, at the lower side of the base 36a, an annular bearing member 137 is arranged to contact with an annular wedge member 138 the later, of course, being of thickness at one side thereof compared to the other side thereof such that the desired angle is produced. A cooperating part 139 secured to flange 140 of the device 32a as by means of bolts 141 is arranged to contact with the under side of the wedge 138. Bolts 142 having nuts 143 with rounded faces 144 serve to clamp the members 36a, 137 and 139 with the wedge 138 therebetween. If desired, the wedge 138 may be constructed in such manner as to permit angular adjustment thereof about the axis of the rotor in order to adjust the angularity of the rotor axis with respect to the supporting structure, although I prefer to provide for the use of one of several slightly differently configured wedges which may be inserted between the members 137 and 139 in order to adjust the rotor axis to the proper angle for a craft of any given characteristics, for example, as illustrated by the vertical and axis lines V and A shown in Figure 10. The ball faces 144 of the nuts 143, of course, serve to permit firm gripping of the parts even though the angle of engagement may differ according to the adjustment made.

While the modified supporting structure just above considered involves the use of a few additional parts over that shown in Figure 2, at the same time it is to be observed that the modified arrangement provides a relatively extensive base on which the rotor is supported and through which the thrust of sustention is transmitted to the fixed leg elements 20a and 21a and thus to the body of the craft.

In considering the operation of the starter mechanism herein disclosed as well as various advantages incident thereto, reference should be made to the following brief outline of the manipulations effected when it is desired to initiate rotation of the rotor prior to takeoff.

With the engine 13 running at a relatively low or idling speed, the lever 95 in cockpit 19 is pulled rearwardly to cause an engagement of the gears 76, 77 and 82. After such engagement, the clutch control is manipulated to connect the clutch discs 109 and 120 and thus transmit torque through the flexible shafting 30 upwardly to the rotor head. As soon as the application of power begins the transmission thereof through the gearing 76—77—82 tends to maintain the driving connection. The engine throttle may now be suitably advanced or opened until the desired takeoff speed of rotation of the rotor has been acquired. In this connection, it is to be observed that when the clutch parts are adjusted to the preferable condition, torque only sufficient to drive the rotor at takeoff speed will be transmitted. That is, the torque limiting mechanism may be so adjusted as to prevent the transmission of more power than is necessary to bring up the rotor speed to that suitable for takeoff.

Further with respect to the manipulations preferably followed in starting rotation of the rotor and making a takeoff, attention is called to the fact that when the desired rotor R. P. M. has been acquired, the engine may simply be throttled down momentarily before making the takeoff so as to permit the rotor ring gear 76 to overrun the remainder of the driving connection. As a result, the gears 77 and 82 (or gears 77 and 82a when the arrangement of Figure 5 is employed) are automatically moved to break the driving connection between the spur 77 and the ring gear 76, and the engine may again and immediately be speeded up in order to effect the takeoff. It will be apparent, therefore, that loss of rotor R. P. M. or speed between the time of disconnecting the driving connection and time of actually making the takeoff is reduced to a minimum in accordance with this invention. The manual starter clutch may then be released at the pilot's convenience, although it will be apparent that, with any of the arrangements shown, the manual starter clutch may be released prior to the takeoff, this also resulting in a disconnection of the driving gearing.

It will be apparent from the foregoing that the manipulations necessary in effecting a takeoff are reduced to a minimum, and it is further to be observed that the structure involved in the starter is, in itself, of an extremely simple type. Note, for example, that by employing a downwardly open drum structure and using such structure to house or at least partially inclose rotor driving gears which are arranged on parallel axes, spur instead of bevel gears may be employed, the former being considerably less expensive to manufacture as well as considerably easier to install in view of the simplified bearing arrangements which may be employed, as compared to those necessary for gears of the bevel type. The foregoing structure, furthermore, permits arranging the gearing in such a way that it is maintained in an entrained condition during the transmission of power and, in addition, so that upon overrunning of the rotor the gearing is automatically disentrained. This, in turn, (especially when using the modifications of Figs. 5 and 6) provides the freest possible running of the rotor, it being noted that, in the structures of Figs. 5 and 6, no interengaging gears rotate with the rotor in normal flight operation.

The power takeoff, clutch and torque limiting mechanism, these parts all being incorporated in one unit or structure, are also highly desirable in view of the compact arrangement thereof and also since they effectively cooperate in transmitting the necessary power and at the same time in limiting the transmission of power in excess of that desired. The torque limiting mechanism is also of advantage since it includes an adjustment of the simplest possible type for controlling the maximum torque to be transmitted as well as for compensating for wear. The simplicity of manufacture and assembly of the power takeoff-clutch-torque limiting mechanism is also of importance, such simplicity, of course, largely resulting from the fact that these three devices are, in effect, incorporated in a single structure.

In considering the matter of simplicity both from a standpoint of manufacture as well as of assembly, attention is also directed to the construction of the rotor hub parts themselves. These parts, it will be observed, are of the simplest possible form, it being noted that substantially no milling operations need be performed for example, in the manufacture of the hub member 44 or the tubular axis member 37. The relatively simple and much less expensive lathe type of machining is substantially all that is required in the production of the head parts.

The means employed for the attachment of the several blades to the hub member are also compact and of simple form, it being noted that a single and readily machined block 64 is employed as a joint part between the two articulations for each blade. The use of a split fitting for the blade root is also of advantage in simplifying as well as reducing the weight and size of the rotor head in general, especially in view of the incorporation therein of a mechanism for adjusting the incidence of the blades in the manner brought out more fully hereinbefore. It is noted, however, that certain features of the blade incidence adjustment mechanism are not claimed herein, per se, but are described and claimed in my co-pending application Serial Number 727,245, filed May 24th, 1934.

The hub structure has still further advantageous features, among which might be mentioned the utilization of a highly efficient type of radial as well as thrust bearing, of small overall dimensions. The general arrangement disclosed, with the thrust bearings dissociated from the radial bearings, and with the radial roller bearings lying between sleeve 37 and hub 44, permits simplification of the rotor hub to a point where it constitutes, in effect, merely a pair of tubular elements of small diameter with elongated roller bearings of small diameter interposed between them, having the lift thrust bearing in the form of rollers positioned at the head of the structure and having means of blade attachment at the exterior of the outer sleeve.

The foregoing features of the hub structure proper, furthermore, cooperate with the downwardly open drum 74, which performs rotor driving as well as braking functions, to maintain the total overall diameter of the rotor head within small limits as well as to efficiently utilize the weight of the parts employed. Such weight may, therefore, be kept relatively low.

Still further, the downwardly open drum structure with the cooperating rotor driving parts housed therein provides for complete protection of such parts from dirt, dust, moisture and the like, and also serves to prevent damage to the starter parts or to other parts which might otherwise come in contact therewith. Another feature of considerable importance is involved in the arrangement of the driving and driven gears within the rotor head structure. Note that the driving and driven gears are both incorporated and journalled within a single unit or structure. Weaving, vibration or oscillation of the rotor head with respect to the pylon mount, therefore, produces no interference whatever with the proper meshing of the gears.

The drum and hub arrangement further cooperates to provide for braking and driving reaction and at the same time leaves ample clearance for individual blade movement, especially on their horizontally extended pivot pins 28, since the driving gears are housed within the drum 74 rather than positioned externally thereof. When disposed externally of the drum, such driving gears necessitate mounting of the blade attachment means somewhat higher than is required in accordance with the present construction. The drum and the blade attachment means may, therefore, be mounted closer to each other, this being of advantage in providing more direct transmission of torque during operation of the starter and also in reducing the overall height of the rotor hub parts.

Attention is also called to the fact that, in the arrangement disclosed, the rotor head mounting structure and the driving or starter parts are so relatively constructed that angular adjustments of the rotor axis may be made without disturbing the driving connection in any manner. Note that the flexible connections 31 in the shafting 30 are so arranged as to compensate for various irregularities in the rotor axis and still maintain the proper rotor drive. Especial attention is also called to the fact that adjustments in the angularity of the rotor axis do not affect the relation between the driving and driven gears incorporated in the rotor head.

In accordance with the foregoing, a highly efficient and neat rotor head or rotor blade mounting structure is provided, said structure being of relatively small diameter and weight and further being arranged to enhance the appearance of the craft as a whole. The transmission system extended between the power takeoff means at the prime mover and the rotor is also of a simple and efficient type since it does not require the use of beveled gearing and the like between relatively angled power transmitting shafts.

I claim:—

1. In an aircraft having a sustaining rotor and a prime mover, a mechanism for driving the rotor including a driving connection extended between the prime mover and the rotor, a clutch in said connection, and means for limiting the torque transmittible through the clutch to a predetermined value including a clutch back-off device associated therewith.

2. In an aircraft having a sustaining rotor and a prime mover, a mechanism for driving the rotor including a driving connection extended between the prime mover and the rotor, a clutch in said connection, and means for limiting the torque transmittible through the clutch to a predetermined value including a clutch back-off device associated therewith and stop means limiting the degree of clutch engagement.

3. In an aircraft having a sustaining rotor and a prime mover, a mechanism for driving the rotor including a driving connection extended between the prime mover and the rotor, a clutch in said connection, and means for limiting the torque transmittible through the clutch to a predetermined value including a clutch back-off device associated therewith, together with means of adjustment arranged to alter the torque transmittible.

4. In an aircraft having a sustaining rotor and a prime mover, a mechanism for driving the rotor including a driving connection extended between the prime mover and the rotor, a clutch in said connection, and means for limiting the torque transmittible through the clutch to a predetermined value including a clutch back-off device associated therewith and adjustable stop means limiting the degree of clutch engagement.

5. In an aircraft having a forward propulsion engine and an autorotationally actuated sustaining rotor, mounting means for the rotor including a rotor head structure incorporating a rotative hub member and a relatively non-rotative member on which the hub member is mounted, the mounting means further including a fixed structure connected with the body of the craft and providing, at a point above the body, a base or a support for said rotor head structure, means for securing the rotor head structure as a unit to said base or support, said latter means including means for adjusting the position of the head structure and thus of the extension of the axis of the hub member, a driven gear carried by the hub member and rotative therewith, a driving gear associated with said driven gear and journaled and mounted on said relatively non-rotative member, and flexible power transmission means extended between the forward propulsion engine and said driving gear.

6. In an aircraft having a forward propulsion engine and an autorotationally actuated sustaining rotor, a mechanism for transmitting driving torque from the engine to the rotor, said mechanism including a driven gear connected with the rotor, a driving gear, and an idler gear movably mounted between a position in which it connects the driven and driving gears and a position in which it disconnects the driven and driving gears, the three gears further being mounted in such manner that overrunning of the driven gear with respect to the driving gear serves to move the idler gear into the position second mentioned, power transmission means between the engine and said gearing, and a manually operable clutch in said power transmission means.

7. In an aircraft having a forward propulsion engine and an autorotationally actuated sustaining rotor, a mechanism for transmitting driving torque from the engine to the rotor, said mechanism including a driven gear connected with the rotor, a driving gear, and an idler gear movably mounted between a position in which it connects the driven and driving gears and a position in which it disconnects the driven and driving gears, the three gears further being mounted in such manner that overrunning of the driven gear with respect to the driving gear serves to move the idler gear into the position second mentioned, manually operable means for moving said idler gear to its position in which it connects the driven and driving gears, power transmission means between the engine and said gearing, and a manually operable clutch in said power transmission means.

8. In an aircraft having a forward propulsion engine and an autorotationally actuated sustaining rotor, a mechanism for transmitting driving torque from the engine to the rotor, said mechanism including a driven gear coaxially arranged and connected with the rotor, a driven gear, an idler gear, movable means for mounting the idler gear mounted coaxially with the rotor to pivot about the rotor axis and to provide for movement of the idler gear between a position in which it connects the driven and driving gears and a position in which it disconnects the driven and driving gears, the three gears further being mounted in such manner that overrunning of the driven gear with respect to the driving gear serves to move the idler gear into the position second mentioned, and a manually operable control operatively coupled with said mounting means for effecting movement of the idler gear.

9. In an aircraft having a forward propulsion engine and an autorotationally actuated sustaining rotor, a mechanism for transmitting driving torque from the engine to the rotor, said mechanism including a driven gear connected with the rotor, a driving gear, an idler gear for connecting and disconnecting the driven and driving gears, mounting means for the idler gear providing for movement thereof between a position in which it connects the driven and driving gears and a position in which the idler gear is disconnected from the driven gear, the three gears further being mounted in such manner that overrunning of the driven gear with respect to the driving gear serves to move the idler gear into the position second mentioned, power transmission means between the engine and said gearing, and a manually operable clutch in said power transmission means.

10. In an aircraft having a forward propulsion engine and an autorotationally actuated sustaining motor, a mechanism for transmitting driving torque from the engine to the rotor, said mechanism including a driven gear connected with the rotor, a driving gear, and an idler gear movably mounted between a position in which it connects the driven and driving gears and a position in which it disconnects the driven and driving gears, the three gears further being mounted in such manner that overrunning of the driven gear with respect to the driving gear serves to move the idler gear out of mesh with the driving gear, and a manually operable control element, with operating connections extended therefrom to the idler gear, for moving said gear to its position in which it connects the driven and driving gears, such element being movable to "disconnected" position under the influence of movement of the idler gear out of mesh with the driving gear.

11. In an aircraft having a forward propulsion engine and an autorotationally actuated sustaining rotor, a mechanism for transmitting driving torque from the engine to the rotor, said mechanism including a driven gear connected with the rotor, a driving gear, and an idler gear movably mounted between a position in which it connects the driven and driving gears and a position in which it disconnects the driven and driving gears, the three gears further being mounted in such manner that overrunning of the driven gear with respect to the driving gear serves to move the idler gear out of mesh with the driving gear, and a manually operable control element, with operating connections extended therefrom to the idler gear for moving said gear to its position in which it connects the driven and driving gears, such element being movable to "disconnected" position under the influence of movements of the idler gear out of mesh with the driving gear, and said control element further being biased to disconnected position.

12. In an aircraft having a forward propulsion engine and an autorotationally actuated sustaining rotor, a mechanism for transmitting driving torque from the engine to the rotor, said mechanism including a driven gear connected with the rotor, a driving gear, and an idler gear movably mounted between a position in which it connects the driven and driving gears and a position in which it disconnects the driven and driving gears, the three gears further being mounted in such manner that overrunning of the driven gear with respect to the driving gear serves to move the idler gear into the position second mentioned, means for moving said idler gear to its position in which it connects the driven and driving gears, power transmission means between the engine and said gearing, a clutch in said power transmission means, and separate manually operable control elements for actuating said means and said clutch.

13. In an aircraft having a forward propulsion engine and a sustaining rotor adapted to be autorotationally actuated in flight; a mechanism for transmitting driving torque from the engine to the rotor including power transmission means; a device in said power transmission means for connecting and disconnecting the power drive and including a driven gear, a driving gear, and an idler gear movably mounted between a position in which it connects the driven and driving gears and a position in which it disconnects the driven and driving gears, the three gears further being mounted in such manner that overrunning of the driven gear with respect to the driving gear serves to move the idler gear into the position second mentioned; a second device for connecting and disconnecting the power drive arranged in said power transmission means between the forward propulsion engine and the first device; and means for controlling said devices.

HERACLIO ALFARO.

CERTIFICATE OF CORRECTION.

Patent No. 2,003,331.  June 4, 1935.

HERACLIO ALFARO.

It is hereby certified that error appears in the printed specification of the above numbered patent requiring correction as follows: Page 8, first column, line 65, for "motor" read rotor; and second column, line 3-4, claim 10, for "opering" read operating; and that the said Letters Patent should be read with these corrections therein that the same may conform to the record of the case in the Patent Office.

Signed and sealed this 9th day of July, A. D. 1935.

Bryan M. Battey (Seal)

Acting Commissioner of Patents.